(12) United States Patent
Dellostritto

(10) Patent No.: US 11,170,373 B2
(45) Date of Patent: Nov. 9, 2021

(54) SINGLE SCREEN MOBILE CHECKOUT

(71) Applicant: MasterCard International Incorporated, Purchase, NY (US)

(72) Inventor: Paul Michael Dellostritto, Brooklyn, NY (US)

(73) Assignee: Mastercard International Incorporated, Purchase, NY (US)

( * ) Notice: Subject to any disclaimer, the term of this patent is extended or adjusted under 35 U.S.C. 154(b) by 1420 days.

(21) Appl. No.: 15/331,272

(22) Filed: Oct. 21, 2016

(65) Prior Publication Data

US 2018/0114223 A1   Apr. 26, 2018

(51) Int. Cl.

| | |
|---|---|
| G06Q 20/40 | (2012.01) |
| G06Q 20/34 | (2012.01) |
| G06Q 20/12 | (2012.01) |
| G06Q 30/06 | (2012.01) |
| G06Q 20/36 | (2012.01) |
| G07G 1/12 | (2006.01) |
| G06Q 20/20 | (2012.01) |
| G07G 1/01 | (2006.01) |
| G06Q 20/32 | (2012.01) |

(52) U.S. Cl.
CPC ......... *G06Q 20/4012* (2013.01); *G06Q 20/12* (2013.01); *G06Q 20/20* (2013.01); *G06Q 20/322* (2013.01); *G06Q 20/34* (2013.01); *G06Q 20/36* (2013.01); *G06Q 30/0633* (2013.01); *G07G 1/01* (2013.01); *G07G 1/12* (2013.01)

(58) Field of Classification Search
None
See application file for complete search history.

(56) References Cited

U.S. PATENT DOCUMENTS

| | | | | |
|---|---|---|---|---|
| 7,962,415 | B2 * | 6/2011 | Gupta | G06Q 20/401 |
| | | | | 705/51 |
| 2010/0308110 | A1 * | 12/2010 | Maddocks | G07F 7/1025 |
| | | | | 235/382.5 |
| 2011/0078081 | A1 * | 3/2011 | Pirzadeh | H04L 12/14 |
| | | | | 705/44 |
| 2012/0143752 | A1 * | 6/2012 | Wong | G06Q 20/227 |
| | | | | 705/41 |
| 2014/0114857 | A1 * | 4/2014 | Griggs | G06Q 40/00 |
| | | | | 705/44 |
| 2014/0164254 | A1 * | 6/2014 | Dimmick | G06Q 20/36 |
| | | | | 705/71 |

(Continued)

*Primary Examiner* — Alexander G Kalinowski
*Assistant Examiner* — Paul R Kloberg
(74) *Attorney, Agent, or Firm* — Buckley, Maschoff & Talwalkar LLC

(57) ABSTRACT

Methods, apparatus and systems for operating a consumer mobile device to consummate an online purchase transaction. In some embodiments, the process features a mobile device processor that receives a mobile device single screen checkout request, initializes a single screen checkout application, and displays a single screen checkout user interface on a touch screen component. The single screen checkout user interface partially overlays a merchant checkout webpage, and includes purchase transaction options and a cardholder verification method (CVM) request message. The process also includes receiving user input responsive to the CVM request message, and displaying a transaction confirmed message on the touch screen component when the user input satisfies the CVM request message.

14 Claims, 11 Drawing Sheets

(56) References Cited

U.S. PATENT DOCUMENTS

| | | | |
|---|---|---|---|
| 2014/0195359 A1* | 7/2014 | Schulz | G06Q 30/04 705/16 |
| 2015/0032635 A1* | 1/2015 | Guise | G06Q 20/40145 705/72 |
| 2015/0134518 A1* | 5/2015 | Turovsky | G06Q 20/12 705/41 |
| 2016/0012433 A1* | 1/2016 | Marenick | G06Q 20/4014 705/72 |
| 2016/0098698 A1* | 4/2016 | Gopalakrishna | G06Q 20/322 705/71 |
| 2017/0169422 A1* | 6/2017 | Ye | G06Q 20/3276 |
| 2018/0032997 A1* | 2/2018 | Gordon | G06Q 30/0269 |

* cited by examiner

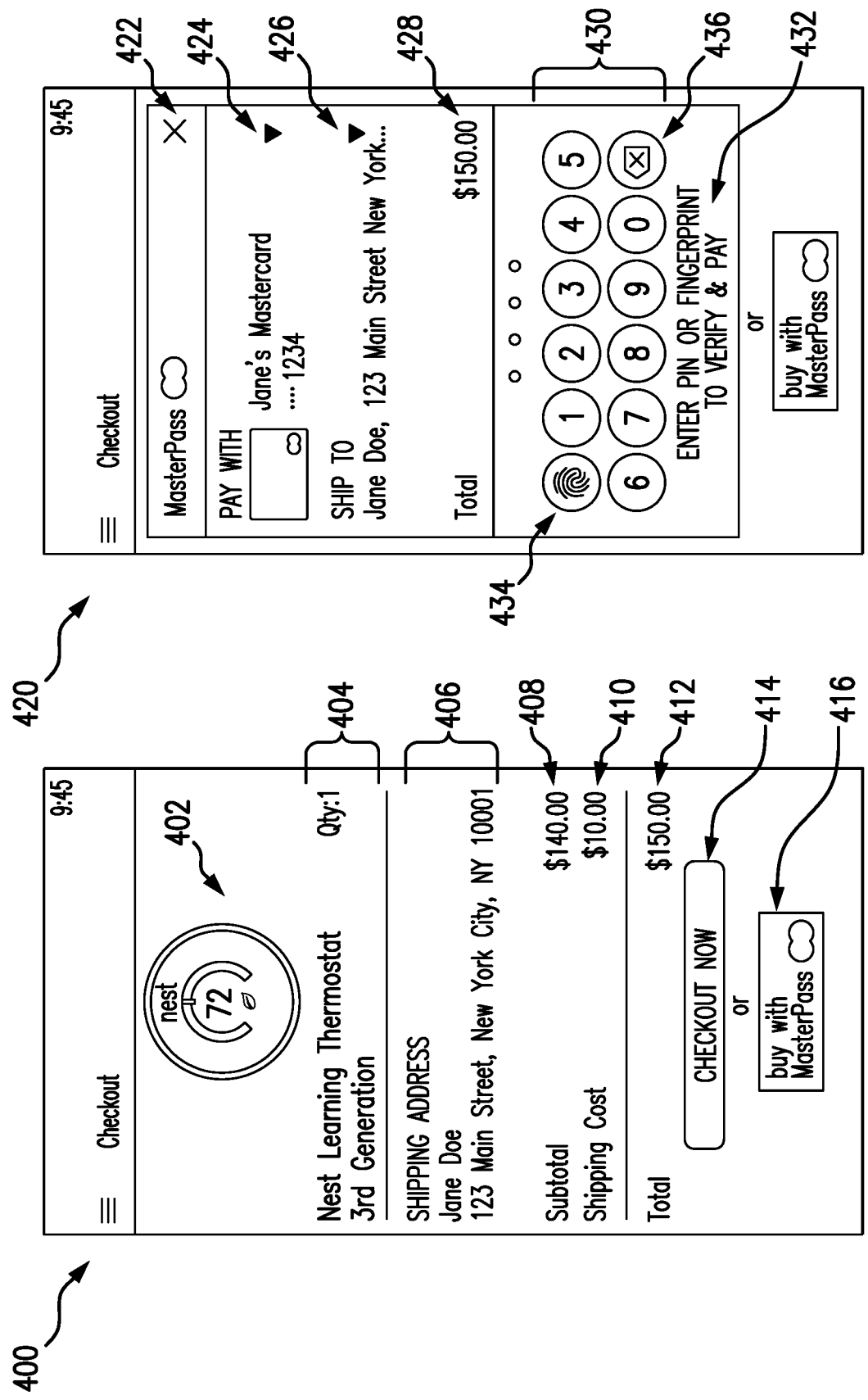

SINGLE SCREEN MOBILE CHECKOUT

FIELD OF THE INVENTION

Exemplary embodiments described herein generally relate to methods and systems for providing a single screen mobile device checkout interface for consumers conducting online purchase transactions. In particular, in some embodiments a single screen checkout application functions to provide a single screen checkout interface on a display screen of the consumer's mobile device that overlays a merchant's checkout page display, and which permits the cardholder to make one or more purchase transaction selections.

BACKGROUND

Payment card accounts such as credit card accounts, debit card accounts and pre-paid debit card accounts are in widespread use. In a retail store environment, a cardholder typically presents a plastic payment card, which may be a magnetic stripe and/or chip card, at a point of sale (POS) device as payment for goods and/or services. The POS device may read account information from the card (e.g., via a magnetic stripe or through wireless communication with an integrated circuit in the card, or via electrical contacts on the card) and initiate a payment card account transaction using the information read from the card.

Payment card accounts are also widely used in e-commerce transactions. For example, a cardholder may use browser software running on a personal computer or a mobile device, such as a smartphone, to access a merchant's online store webpage. After selecting goods for purchase and then opting to check out, the cardholder may be prompted to enter payment card account information into a data entry screen that has been downloaded to the cardholder's computer (or mobile device) and displayed on a display component of the smartphone. In response, the merchant's e-commerce host computer may initiate a payment card account transaction using the information entered by the cardholder.

Many cardholders own multiple payment card accounts. According to one type of proposed arrangement, a cardholder may store data associated with one or more of their payment card accounts within a digital wallet that is offered by a wallet service provider. In particular, a cardholder (or user) may enroll or register one or more of their payment card accounts at a wallet service provider's website. The wallet service provider may store sensitive information associated with the one or more payment card accounts in a data partition that is dedicated to the user to thereby form a digital wallet. When the user seeks to check out during an e-commerce shopping transaction, in some implementations the user is given an option to access a digital wallet stored by the digital service provider.

As a result of data communication among or between the cardholder's mobile device, the merchant's e-commerce host computer, and the wallet service provider's computer, the user may be presented with options for selection of an enrolled payment card account for use in an e-commerce transaction. Once the user selects the desired payment account from the digital wallet, the merchant may use the corresponding account information to initiate a payment card account transaction using that selected payment card account. This process may entail presentation of multiple pages of information and/or selection options (or screen displays) which replace the merchant's display screen, and which may appear sequentially on the display screen of the cardholder's user device. In some cases, the multiple display screens can confuse and/or disorient the cardholder, especially if it appears to the cardholder that the process involved navigating away from the merchant's website and/or checkout webpage to another webpage. In such cases, cardholders have been known to abandon the checkout process because it raised security concerns, and/or because it was too lengthy, and/or because it was too cumbersome.

Accordingly, a need exists for a user-friendly, convenient and secure cardholder mobile device checkout process that eliminates customer confusion, provides the cardholder with the confidence that he or she has not navigated away from the merchant's website and/or checkout webpage, and provides a secure purchase transaction experience.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which:

FIGS. 4A-4E are examples of screen displays (or screen shots) of a mobile device single-screen checkout user interface in accordance with some other embodiments.

Figure 1:
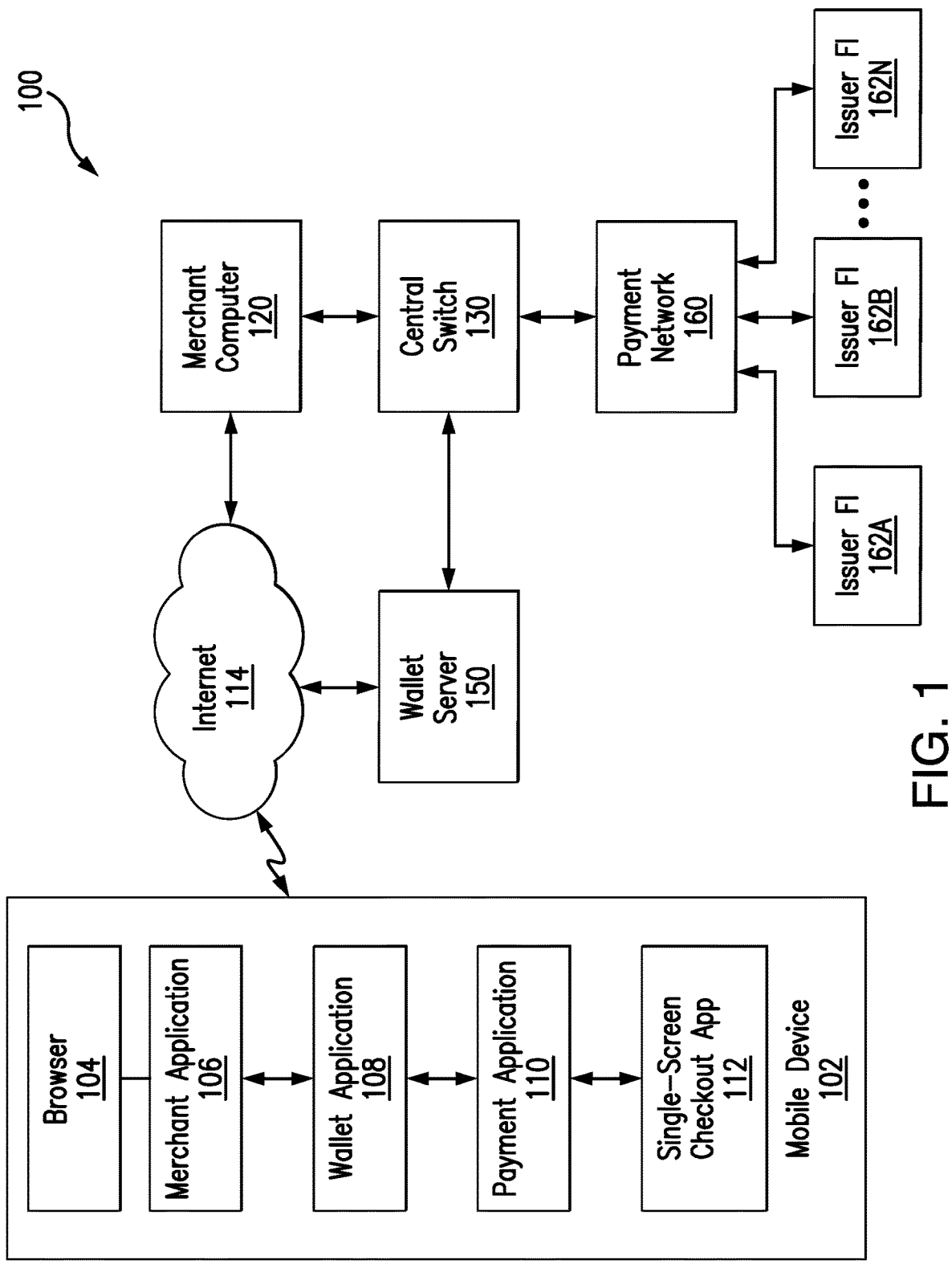
FIG. 1 is a block diagram illustrating an example of a mobile device purchase transaction system in accordance with some embodiments of the disclosure.

Throughout the drawings and the detailed description, unless otherwise described, the same drawing reference numerals will be understood to refer to the same elements, features, and/or structures. The relative size and/or depiction(s) of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and that principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In addition, in some cases well-known structures and/or processes are not shown or described in order not to obscure the description with unnecessary detail(s). Thus, the present disclosure is not intended to be limited to the embodiments shown, but is to be accorded the widest scope consistent with the principles and/or features disclosed herein.

In general, and for the purpose of introducing concepts of the present invention, one or more exemplary embodiments relate to a single-screen checkout application for use by a consumer or cardholder when shopping online with a mobile device. The single-screen checkout application provides a convenient and user-friendly checkout process experience. For example, a cardholder utilizes browser software on his or her Smartphone to navigate to a merchant's website to shop, selects products and/or services to purchase, and then adds the products and/or services to the merchant's electronic shopping cart. When the cardholder is finished shopping (i.e., is finished adding items to the merchant's electronic shopping cart) and wishes to finalize or consummate the purchase transaction, he or she then initiates a checkout process. In some embodiments, a mobile device processor of the customer or cardholder's mobile device receives a checkout request indication or input (or a purchase transaction request) from the customer (or cardholder) which causes initiation of the single-screen checkout application. The single-screen checkout application then generates a single-screen checkout user interface that partially overlays the merchant's checkout page on a display screen component (or touch screen component) of the cardholder's mobile device, and provides purchase transaction options for selection by the user. Thus, the single-screen checkout user interface leaves a small portion of the merchant's checkout page visible to the customer as an indication that the customer has not navigated away from the merchant's website page.

In some embodiments, the single-screen checkout user interface includes an indication of a digital wallet, a total cost (i.e., a monetary amount for the item(s) selected by the cardholder), a small or mini touch screen keypad, and one or more of a payment card account selection menu, a shipping address menu, and a shipping type menu. The cardholder utilizes the various menus (which may be drop down type menus) to make selections of, for example, a payment card account within a digital wallet to use for the transaction, a shipping address, and/or a shipping method. The mobile device processor running the single-screen checkout application then generates and displays a total transaction amount on the single-screen display, which includes the shipping cost, and which may include other costs (such as any applicable sales taxes). The shipping cost may change as the cardholder decides on which shipping address to use and/or the type of shipping method to utilize (such as overnight express shipping, five-day shipping, first class mail, or the like, which typically have different costs associated therewith). At this point in the process, the single-screen checkout user interface may include an indication of the total transaction amount, the selected payment card account, the selected shipping method, and a request to complete a cardholder verification method (CVM).

The CVM request may be a request, for example, for the cardholder to enter a personal identification number (PIN) and/or to engage in another type of authentication process, for example, a biometric authentication process (such as providing a fingerprint, for example, via a fingerprint sensor or via the touch screen component of the cardholder's device). In some implementations, when the mobile device processor receives the cardholder input associated with the CVM, it displays a "processing" indication while transmitting the selected payment card account information, the total transaction amount and the cardholder input to a wallet server computer and waiting for a response. If all is in order (for example, the cardholder is authenticated and the issuer financial institution of the payment card account authorizes the transaction), in some implementations the mobile device processor receives a confirmation of a successful payment transaction from the wallet server computer. In some embodiments, the mobile device processor then displays (on the display screen component of the cardholder's mobile device) a "transaction successful" message (or similar message indicating transaction authorization) and then a "confirmation" screen is displayed that lists the purchased item(s), the total amount, an indication of the payment card account utilized and an order number. In some implementations, a radio button titled "continue shopping" is provided for the cardholder, which may be selected to return the cardholder to the merchant's website to continue shopping. Such a novel process including the presentation or display of transaction options and/or information eliminates or minimizes user or customer confusion, provides the cardholder with the confidence that he or she has not navigated away from the merchant's website and/or checkout webpage, and provides a secure purchase transaction experience.

Various exemplary embodiments may include a mobile device based remote payment system that makes use of payment applications residing on a consumer's or cardholder's mobile device to allow secure payments to a merchant. Examples herein relate to the user experience (such as for a customer, user, consumer and/or cardholder), whereby the cardholder may initiate payment from a merchant mobile application, and then utilize a single-screen checkout user interface to perform functions (for example, viewing and selecting a digital wallet and a payment card account to be used for payment from among all of the digital wallets available on the cardholder's mobile device, selecting a shipping address, and/or selecting a shipping option). In some embodiments, the cardholder may also be presented with a display screen that enables viewing of offers and/or rewards associated with the one or more of the available payment card accounts and the option to apply such offers and/or rewards to the purchase transaction. Accordingly, the cardholder may utilize the single-screen checkout user interface to complete the checkout process including cardholder authentication without interrupting the mobile merchant application, and enabling the digital wallet to generate secure transaction credentials which are returned to the merchant through a central trusted entity (for example, a central switch such as the MasterPass™ switch, which is owned and/or operated by MasterCard International Incorporated, the assignee of the present application). In some embodiments, transaction credentials are generated by the single-screen mobile payment application, which may be a software application running in the main processor of the cardholder's mobile device, or in a secure application environment (such as a Trusted Execution Environment) of the cardholder's mobile device, or on a separate tamper resistant hardware component (a Secure Element) of the cardholder's mobile device.

As used herein, the term "wallet" or "mobile wallet" or "digital wallet" is used to refer to electronic data representing a collection of one or more payment instruments, which are typically offered by an issuer financial institution (FI), such as a consumer bank, to a consumer (or user). A particular person or consumer may have multiple payment instruments (such as credit cards, debit cards, private label cards, loyalty cards, or the like) or "payment cards" where the payment card data has been provisioned by the payment card issuer (which may be financial institutions (FIs) such as banks) into the cardholder's mobile wallet resident in his or her mobile device. As another example, payment card account data may be added to a digital wallet by the cardholder via a third party entity with no integration with the issuer. In some embodiments, during an enrollment or registration process the cardholder specifies a particular payment card account (resident in a particular digital wallet) for use in conducting purchase transactions with one or more designated merchants.

The exemplary embodiments disclosed herein include multiple advantages, for example, use of a smart button to initiate the single-screen checkout application, allowing a cardholder to view and choose payment cards from across multiple digital wallets on the mobile device, and allowing the consumer to select a shipping address and/or shipping method while providing assurance that the cardholder has not navigated away from the merchant's website. Some embodiments also include the use of a central switch to return payment card data to a merchant computer, use of the central switch to validate that a mobile application claiming to be a cardholder's digital wallet is legitimate, and use of the central switch to validate that that the application requesting payment is from a legitimate merchant.

FIG. 1 is a block diagram illustrating an example of a mobile device purchase transaction system 100 in accordance with some embodiments. A user may operate a mobile device 102 (which may be, for example, a Smartphone, a tablet computer, a laptop computer, a digital music player, and the like) that executes software including an internet browser 104, one or more merchant applications 106, one or more wallet applications 108, and one or more payment applications 110, and a single-screen checkout application 112 to perform purchase transactions via the Internet 114 with one or more merchant computers 120. The mobile device purchase transaction system 100 may also include a wallet server computer 150 configured for communication with the mobile device 102, a central switch 130, a payment network 160 and a plurality of issuer financial institutions (FIs) 162A to 162N.

Examples of transactions are described further below in association with screen shots of the various display screens provided to a user. However, with reference to FIG. 1 in general, and by way of introduction, a purchase transaction may include the user of the mobile device 102 interacting with a merchant application 106 to select one or more products or services for purchase from a merchant's website hosted by the merchant computer 120. The merchant application 104 may communicate via the Internet 114 (or via some other network, not shown) with the merchant computer 120 and the central switch 130 to initialize a checkout transaction. In some embodiments, based on a selection by the cardholder of a "MasterPass" (and/or a "change wallet") radio button provided by the merchant application (and shown on the cardholder's display screen), the single-screen checkout application 112 runs on the cardholder's mobile device 102 and provides a single-screen checkout display that partially overlays the merchant's checkout display screen (which will be discussed in more detail below).

In some embodiments, the single-screen checkout user interface includes an electronic wallet menu (wherein the cardholder can select a payment card account for use in the transaction), a shipping method menu (wherein the cardholder can select a shipping address and/or type of shipping method), a total cost (i.e., a monetary amount for the transaction), and a touch-screen keypad. The cardholder utilizes these various menus (which may be drop down type menus) to make selections of, for example, a particular payment card account to use from the digital wallet for the purchase transaction, a shipping address and a shipping method. The mobile device processor then generates and displays a total transaction amount on the mobile device display screen, which includes the shipping cost (which depends on the type of shipping and/or shipping address selected by the cardholder) and may include other costs (such as any applicable sales taxes). An indication of the total transaction amount, the selected payment card account (including a likeness of the actual payment card), the shipping address and the selected shipping method appears on the mobile device display screen along with a request to complete a cardholder verification method (CVM) to authenticate and/or validate the cardholder as genuine. For example, the CVM request may be for the cardholder to enter, using the touch screen keypad, a personal identification number (PIN) or a mobile PIN (or mPIN). In some implementations, after the mobile device processor receives the cardholder input associated with the CVM, it then transmits the selected payment card account information, the total transaction amount and the cardholder input via the Internet 114 to the wallet server computer 150 for cardholder authentication and purchase transaction authorization processing. In some other implementations, the single-screen checkout application 112 (possibly in conjunction with a credential management system (not shown) or under control of a secure element on the mobile device 102) authenticates the user or cardholder. In this case, the single-screen checkout application then provides an indication that the user has been validated, mobile payment device information, and purchase transaction data to the wallet server 150 for association with the checkout transaction at the central switch 130. Accordingly, in either case, the merchant server 120 may obtain the payment device information and the transaction information via the central switch 130, and a transaction authorization request is then submitted to the payment network 160 for further processing. In particular, the payment network 160 determines which of the issuer financial institutions (FIs) 162A, 162B to 162N is the issuer of the cardholder's payment card account, and then provides that issuer FI with the purchase transaction data for further processing. For example, issuer FI 162 receives the cardholder's payment card account information and the transaction amount, authorizes the purchase transaction, and transmits an authorization message to the payment network 160, which is forwarded, to the central switch 130. In some implementations, the central switch 130 provides the authorization message to the merchant computer 120 and/or to the wallet server 150, and a then a "transaction complete" confirmation message is transmitted to the cardholder's mobile device 102 for display on a display component (not shown) so that the cardholder knows that the purchase transaction was successfully completed.

Thus, in accordance with various aspects, the system 100 may utilize one or more central switches 130 which provide the interconnectivity between a plurality of merchant computers (which may be associated with a plurality of different merchants) and a plurality of wallet applications 108 (e.g., associated with a number of cardholders and issued by a number of issuer FIs). Each cardholder may have one or more wallet applications 108 and/or one or more single-screen checkout applications 112, and each wallet application 108 may hold information associated with one or more payment card accounts of the cardholder. As described above, during a transaction a cardholder (operating a device such as mobile device 102) may use the single-screen checkout application to select the payment card account (which could be a merchant card account, a credit card account, a debit card account, and the like), the shipping address, and the shipping method to be used in the purchase transaction. In accordance with various exemplary embodiments, the mobile device purchase transaction system 100 may include a plurality of cardholder mobile devices 102, a plurality of merchant computers 120, and a plurality of wallet server computers 150. In addition, the wallet server computer(s) 150, central switch computer 130 and payment network 160 may be managed by and/or operated by a payments processing entity such as MasterCard International Incorporated, the assignee of the present application.

Figure 2:
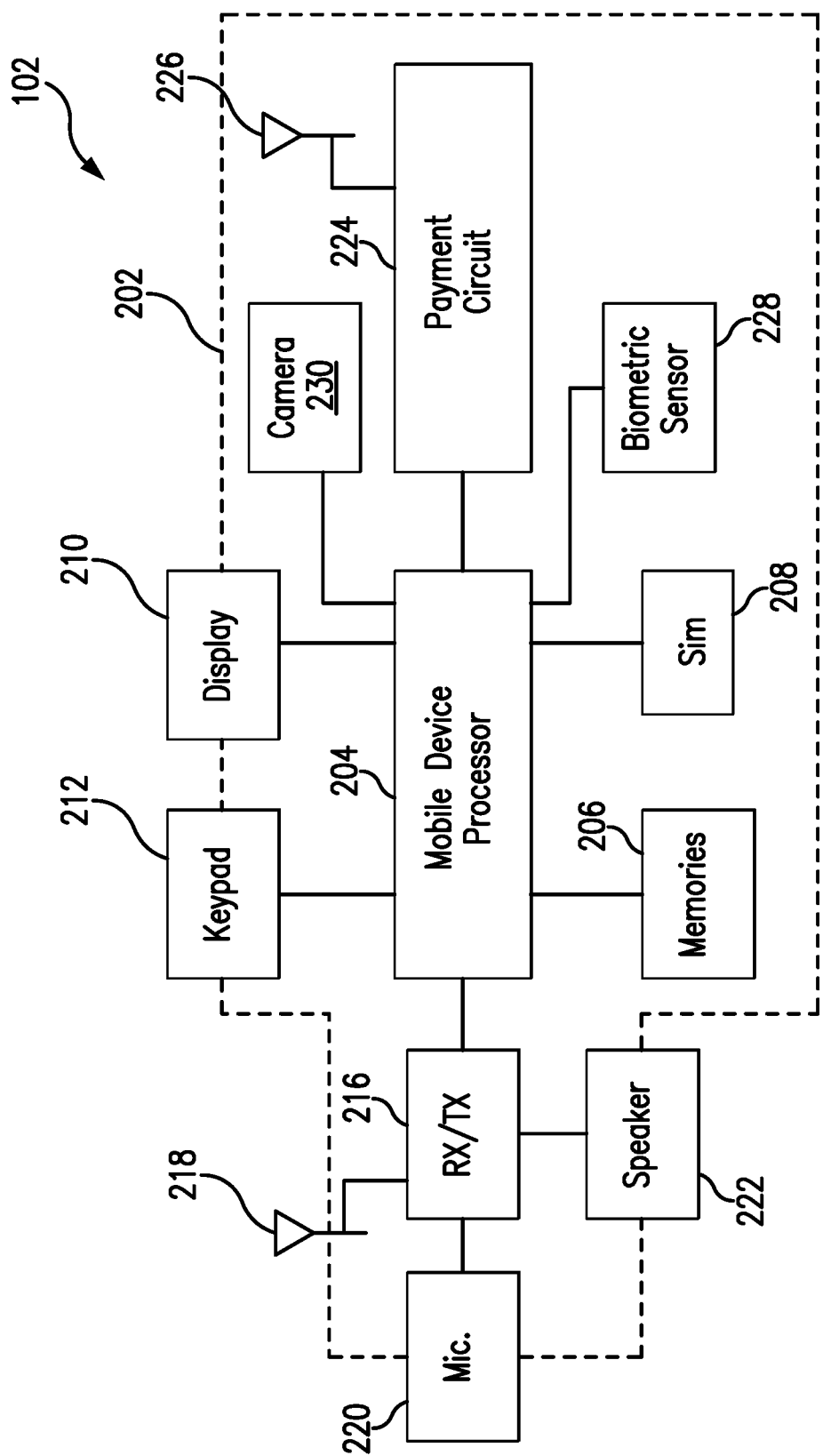
FIG. 2 is a block diagram illustrating an example of a mobile device in accordance with some embodiments of the disclosure.

FIG. 2 illustrates a mobile device 102 in accordance with an exemplary embodiment. For example, the mobile device 102 may be a mobile phone (such as a Smartphone), a tablet computer, a laptop computer, a phablet, a smart watch, an internet appliance, and the like, and may contain convention hardware components. The mobile device 102 may include a conventional housing (indicated by the dashed line 202) that contains and/or supports the components of the mobile device 102. The housing 202 may be shaped and sized to be held in a user's hand, and may for example fit in the palm of the user's or cardholder's hand. In some embodiments, the housing 202 may have a different form factor (e.g., as a tablet computer, mini-tablet computer, or the like).

The mobile device 102 may include a mobile device processor 204, for controlling the over-all operation of the mobile device 102. For example, the mobile device processor 204 may include one or more processing devices, for example, a multicore processor, a reconfigurable multicore processor, and/or the like. Other components of the mobile device 102, which are in communication with and/or controlled by the mobile device processor 204, include memory devices 206 (e.g., program and working memory and the like); a subscriber identification module (SIM) card 208; a keypad 212 for receiving user input; and a display component 210 (which may include a display screen and/or touch screen for displaying output information to, and receiving input information from, the user or cardholder). Thus, in some embodiments the keypad 212 is a conventional 12-key telephone keypad, and may include additional buttons, switches and/or keys (such as a conventional rocker-switch and/or select keys, soft keys, and send and/or end keys). In some other implementations, such as for a Smartphone, the keypad 212 represents a digital keypad provided on a touch screen display 210 of the mobile device 102.

The mobile device 102 may also include receive/transmit circuitry 216 that is in communication with and/or controlled by the control circuitry 204. The receive/transmit circuitry 216 is coupled to antenna 218 and may provide the communication channel(s) by which the mobile device 102 communicates via one or more communications networks (not shown). The receive/transmit circuitry 216 may operate both to receive and transmit voice signals, in addition to performing data communication functions, such as GPRS (general packet radio service) communications. For example, the receive/transmit circuity 216 may connect the mobile device 102 to a network such as the Internet, a cellular network, and the like. Accordingly, a user of the mobile device 102 may control the mobile device 102 to, for example, navigate to merchant websites on the World Wide Web, download mobile applications, and the like.

The mobile device 102 may further include a microphone 220, coupled to the receive/transmit circuitry 216. The microphone 220 may receive voice input from the user of the mobile device 102. In addition, a loudspeaker 222 is included to provide sound output to the user, and is coupled to the receive/transmit circuitry 216. In this example, the receive/transmit circuitry 216 may transmit, via the antenna 218, voice signals generated by the microphone 220, and reproduce, via the loudspeaker 222, voice signals received via the antenna 218. The receive/transmit circuitry 216 may also handle transmission and reception of text messages, video streams, mobile applications, and other data communications via the antenna 218.

The mobile device 102 may also include a payment circuit 224 and a loop antenna 226, coupled to the payment circuit 224. The payment circuit 224 may include functionality that allows the mobile device 102 to function as a contactless payment device. In some embodiments, the payment circuit 224 includes a processor (not separately shown) and a memory (not separately shown) that is coupled to the processor and stores program instructions for controlling the processor. Although shown as separate from the mobile device processor 204, the payment circuit 224 and/or its processor component(s) may be integrated with the mobile device processor 204. In accordance with some embodiments, the mobile device 102 may include a secure element (not separately shown), which may be incorporated into the payment circuit 224, the memories 206, the mobile device processor 204, the SIM card 208, and/or the like. As is familiar to those skilled in the art, the secure element may be constituted with a microprocessor and volatile and/or nonvolatile memory that are secured from tampering and/or reprogramming by suitable measures. Thus, the secure element may, for example, manage functions such as storing and reading out a payment card account number, and may handle cryptographic processing. Moreover, and in accordance with some embodiments, the secure element may store and apply a cardholder verification rule associated with one or more cardholder verification methods (CVMs), and may handle receipt and/or verification of cardholder verification input (such as entry of a PIN). As an example of a secure element, the mobile device 102 may include a trusted platform module (TPM) for secure cryptographic processing and storage. The TPM may provide a trusted or secured application execution environment or a trusted execution environment (TEE). The trusted area may have enhanced security restrictions and limit the amount of programs that have access to the storage and programs therein.

The mobile telephone 102 may also include one or more biometric sensors 228 and an integrated digital camera 230, which can be configured to perform various functions, including obtain cardholder authentication data. For example, the digital camera 230 may be operably connected to the mobile device processor 204 and configured for taking pictures, and may also be utilized to read two-dimensional (2D) barcodes to obtain information, and/or may also be used to take a picture of the user's face for use by an authentication application that may concern facial recognition. The biometric sensors 228 may include one or more of a fingerprint sensor and/or a biochemical sensor and/or a motion sensor. For example, a motion sensor may be operable to generate motion data that can be utilized by the mobile device processor 204 to authenticate a user by identifying the user's walking style or gait. In another example, the biometric sensor may be fingerprint sensor that includes a touch pad or other component (not shown) for use by the user to touch or swipe his or her index finger when fingerprint data is required to authenticate the user. A biochemical sensor may include one or more components and/or sensors operable to obtain user biological data, such as breath data from the user, and/or other types of biological data which may be associated with the user of the mobile device 102. The data obtained by the biometric sensor(s) may be compared to biometric data and/or information of the user stored, for example, in the memories 2016 in order to authenticate the user of the mobile telephone 102. In addition, in some embodiments, the mobile device processor 204 and receiver/transmitter circuitry 216 may be operable to transmit the data resulting from a cardholder authentication process (whether or not a match occurred) to a central switch computer 130 for further processing. The cardholder's mobile device 102 may also contain one or more other types of sensors, such as an iris scanner device (not shown) for generating iris scan data of a user's eye, which may be useful for identifying biometric or other personal data of the mobile device user.

FIGS. 3A-3I are examples of mobile device display component (such as a touch screen) screens (or screen shots) of a mobile device single-screen checkout user interface in accordance with some embodiments. These screen shots are examples of displays or screens presented to a user (such as a cardholder) utilizing the single-screen checkout user interface on the user's mobile device to perform purchase transaction functions and/or to consummate a purchase transaction.

Figures 3A, 3B:
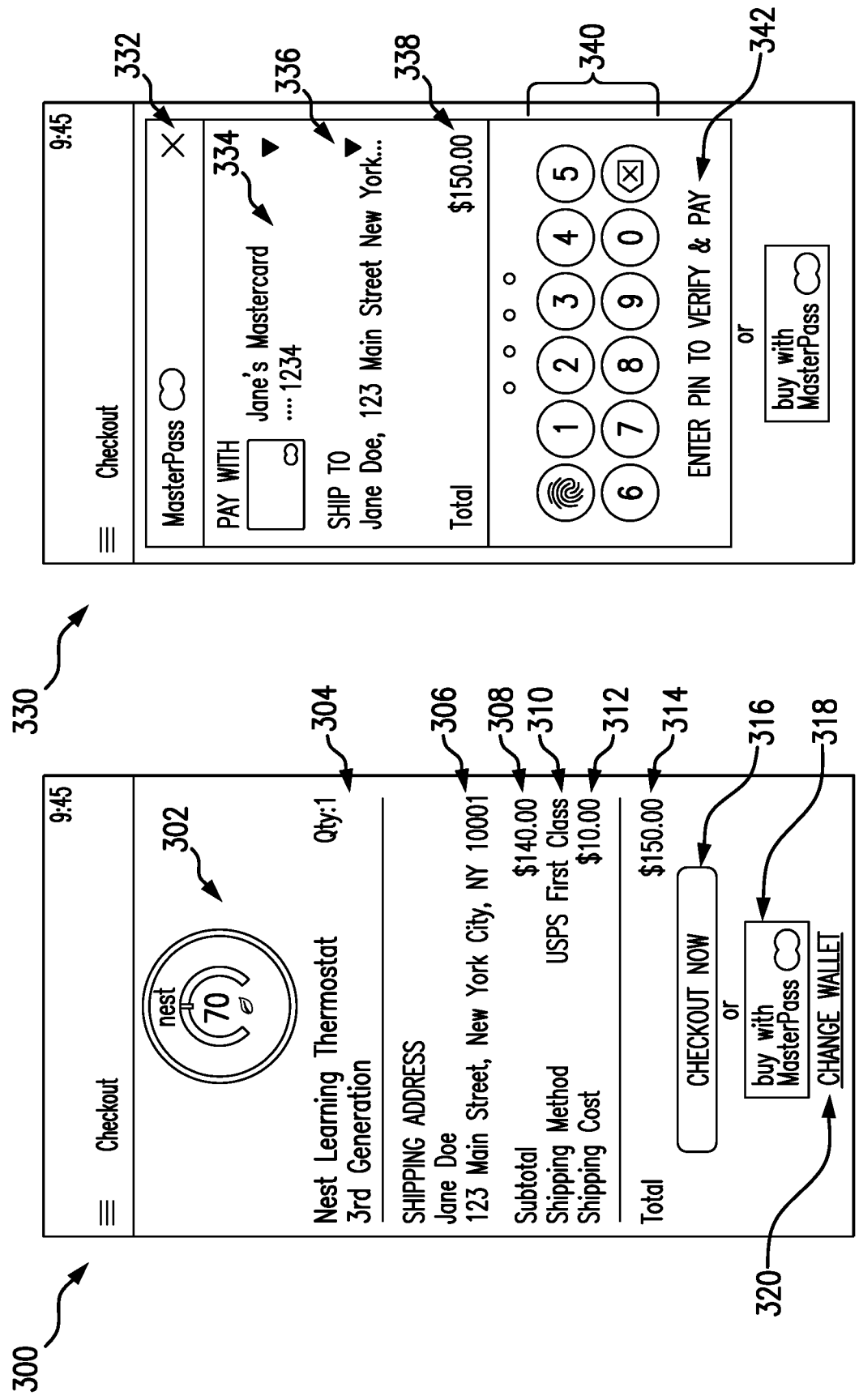
FIGS. 3A-3I are examples of screen displays (or screen shots) of a mobile device single-screen checkout user interface in accordance with some embodiments.

FIG. 3A is an example of a merchant checkout page 300 displayed on a user's mobile device display screen (which is a touch screen in this example) illustrating a merchant application user interface (utilizing, for example, the merchant application 106 of FIG. 1) which the user can utilize to initiate a purchase transaction. In this example, the user has selected a "Nest Learning Thermostat" item 302 to purchase and has navigated to the checkout screen (or merchant checkout page) within the merchant application 106. In this example, the merchant checkout webpage or screen shows the item name and quantity 304, a shipping address 306, a subtotal 308 (of $140.00), a shipping method 310 (U.S. Postal Service first class mail), a shipping cost 312 (of $10.00), and a total cost 314 (of $150.00). On the bottom of the merchant checkout screen are three options for selection by the user: a "Checkout Now" radio button 316, a "Buy with MasterPass™" radio button 318, and a "Change Wallet" link 320. If the user selects the "Checkout Now" button, then the cardholder or customer is directed to a merchant website payment page (not shown) that may be pre-filled with payment card account information that was provided by the user, for example, during a registration process. In this case, the user relies on the merchant's checkout process.

Referring again to FIG. 3A, if the user selects the "Buy with MasterPass™" radio button 318, then the single-screen checkout application 112 is initiated by the user's mobile device and the display 330 of FIG. 3B is presented to the user. (Similarly, if the user selects the "Change Wallet" link 320, the single-screen checkout application will be initiated and the cardholder presented with a similar screen (not shown) wherein one or more other digital wallets can be selected by the user.) In some embodiments, the "Change Wallet" link 320 may be displayed only when the cardholder's mobile device 102 has more than one wallet application 108 installed on the device, or more than one payment card account included in a wallet application. In some embodiments, the single-screen checkout application 112 may make the determination regarding whether or not multiple digital wallets are present on the cardholder's mobile device 102.

Referring again to FIG. 3B, since the user depressed the "Buy with MasterPass™" radio button 318, then a Master-Pass™" single-screen checkout user interface 332 is displayed which partially overlays the merchant's checkout webpage, as shown. In particular, the "Checkout" heading of the merchant's checkout webpage is still visible on the display screen of the consumer's mobile device. As shown, the single-screen checkout user interface 332 includes a payment card account drop down menu 334, a "Ship To" drop down menu 336, a "Total" amount 338, a small or mini keyboard 340 on the user mobile device touch screen, and a message field 342 (which in this example states "Enter PIN to Verify & Pay"). Thus, the single screen checkout user interface includes various purchase transaction options for selection by the user.

Figures 3C, 3D:
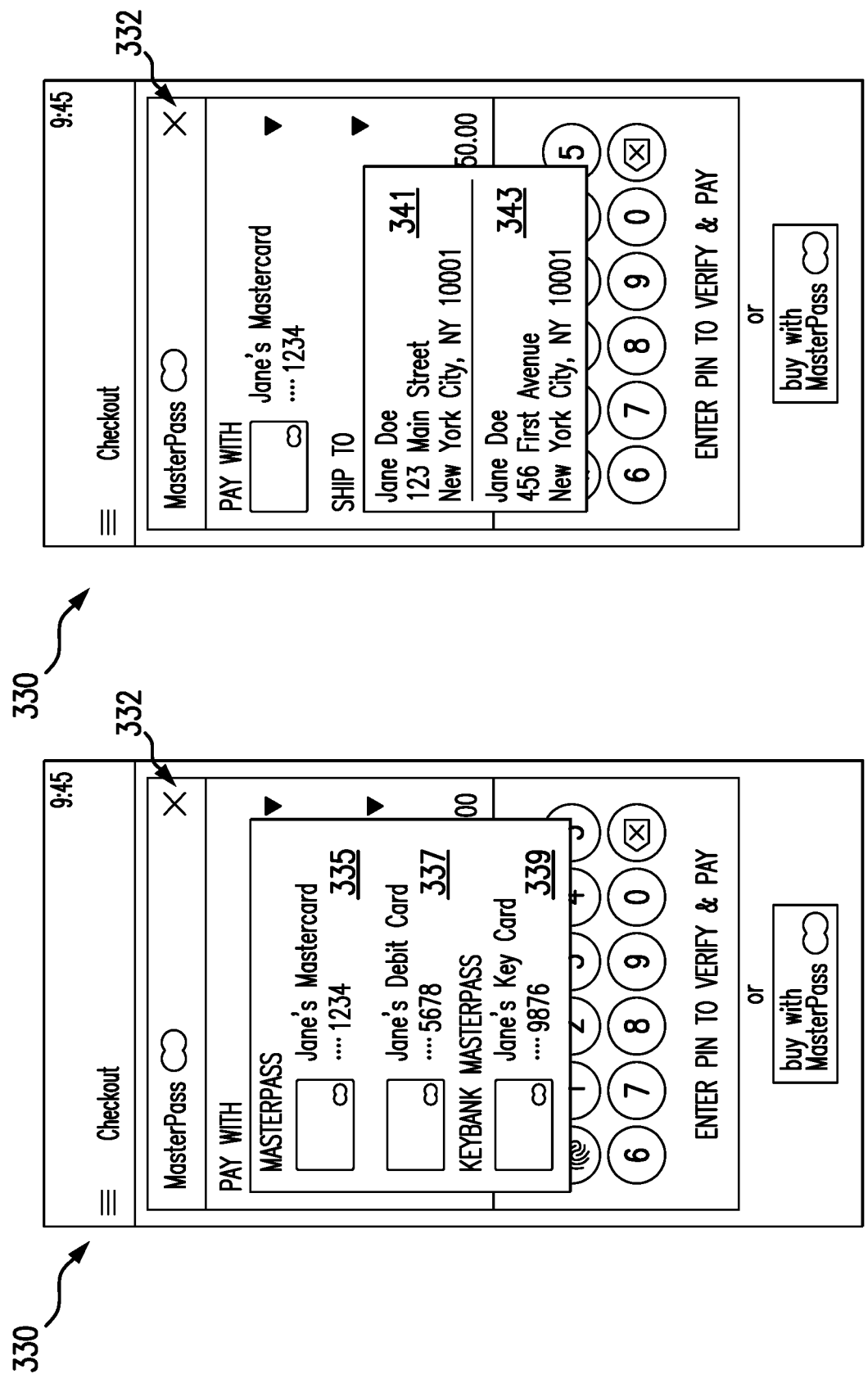

FIG. 3C shows the same single-screen checkout user interface 332 of FIG. 3B but with the payment card account drop down menu 334 selected or opened to show three different payment card accounts to choose from: "Jane's MasterCard" 335, "Janes Debit Card" 337, and "Jane's Key Card" 339 (which may have been named by the cardholder during a digital wallet registration process). As shown, each of these payment card account selections also includes an icon depiction of the specific payment card (which may include the actual color scheme and bank logos, for example, which appear on a face of a physical card) and the last four digits of the payment card account number. Accordingly, in some embodiments the payment card selections include the Issuer financial institution's logo, the payment processor's logo (for example, a MasterPass™ logo), payment card artwork, a card nickname, and the last four digits of the card account number.

Figure 3E:
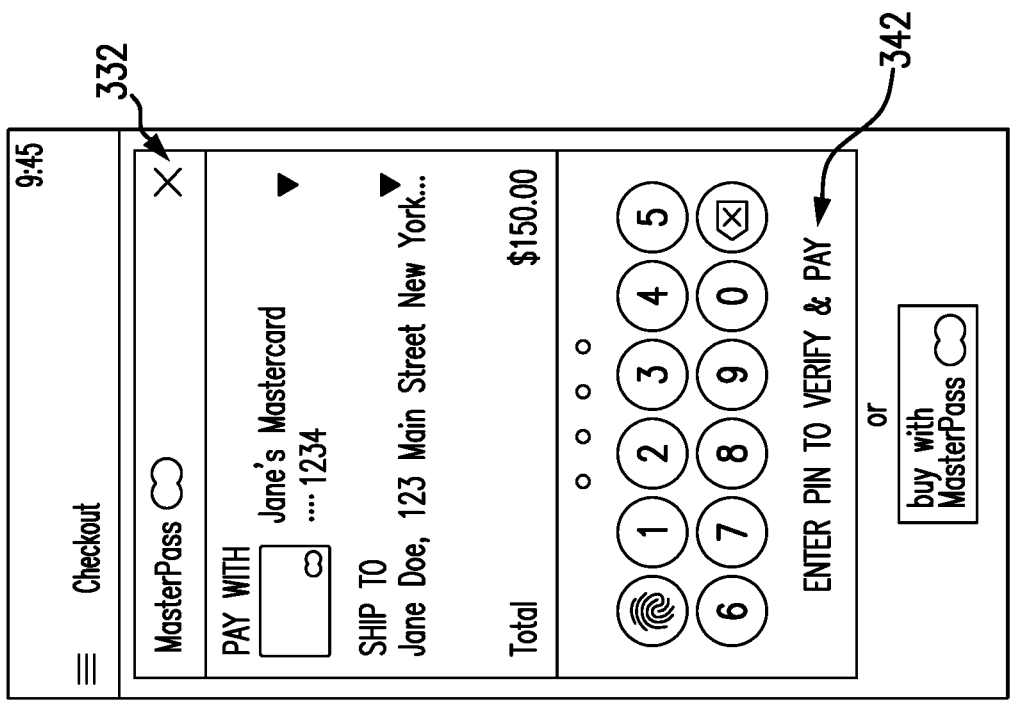
Figure 3F:
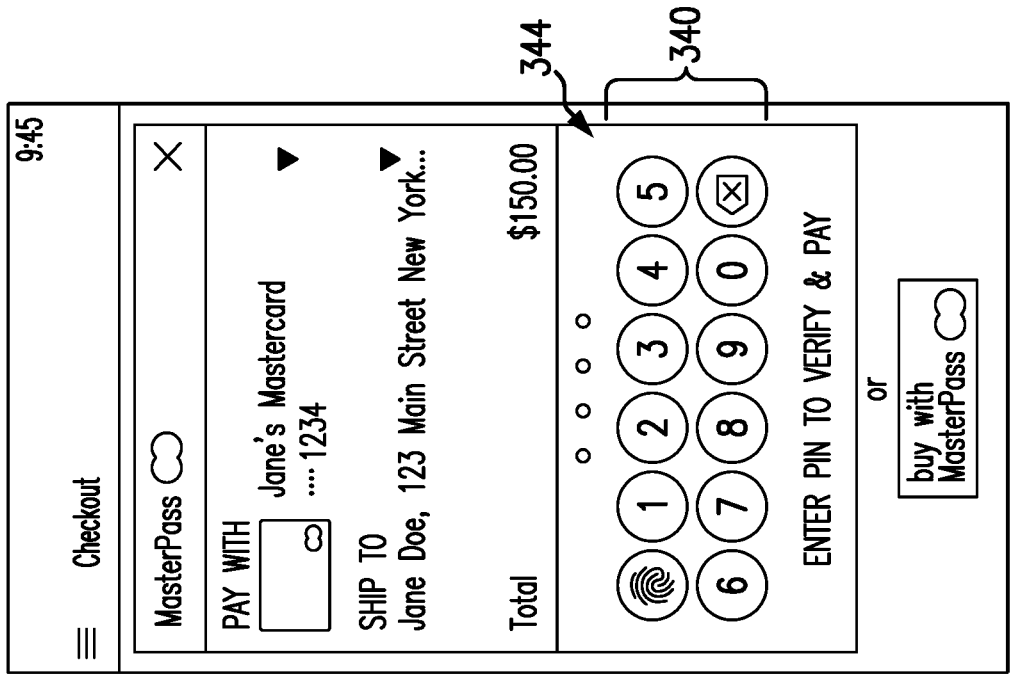

FIG. 3D shows the same single-screen checkout user interface 332 Of FIGS. 3B and 3C after the user has selected "Jane's MasterCard" and has opened the "Ship To" drop down menu 336 to display a first shipping address 341 and a second shipping address 343. FIG. 3E shows the same single-screen checkout user interface 332 of FIGS. 3B-3D after the user has selected "Jane's MasterCard" and the Jane Doe address at 123 Main Street in New York. The message "Enter Pin to Verify & Pay" 342 is also shown, and in FIG. 3F the cardholder has used the mini-keyboard 340 to start entering a 4-digit personal identification number (PIN), which confidentially indicated by indicator dots 344. In particular, the indicator dots 344 as shown in FIG. 3F may change color or otherwise be illuminated after the cardholder uses the touch screen mini keypad 340 to enter the digits that comprise his or her PIN or mPIN. In due course, after the PIN or mPin is verified or authenticated, the indicator dots 344 are replaced with a "transaction successful" indication 346 shown in FIG. 3G (which occurs after the correct PIN or mPIN is entered).

Figure 3H:
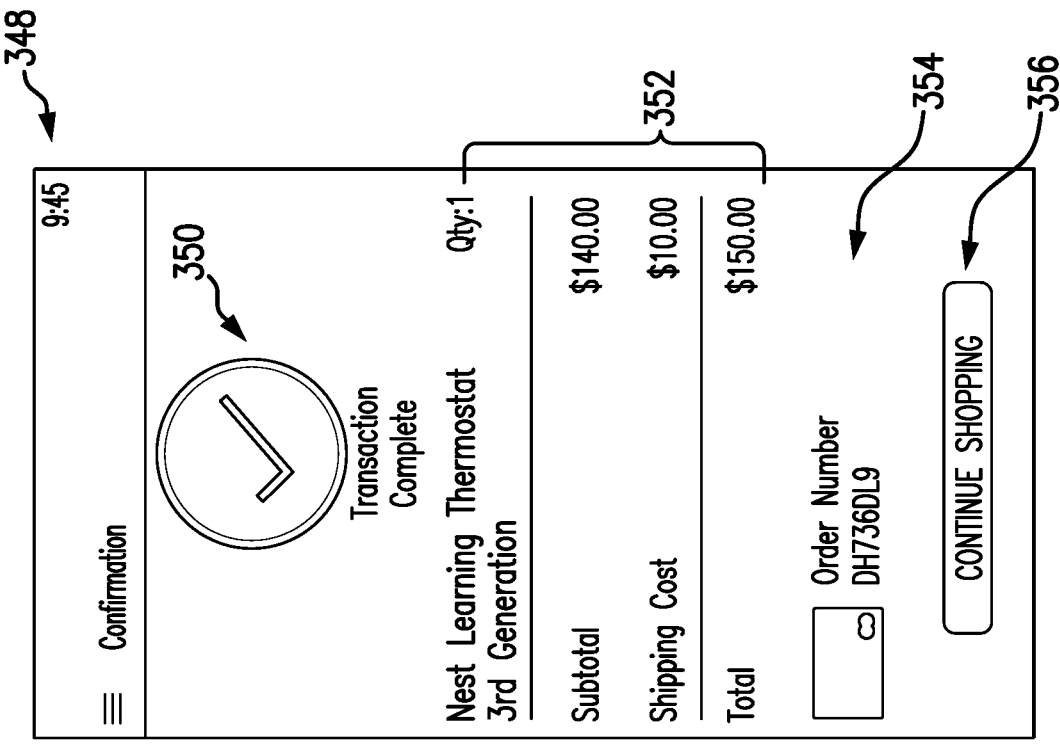
Figure 3G:
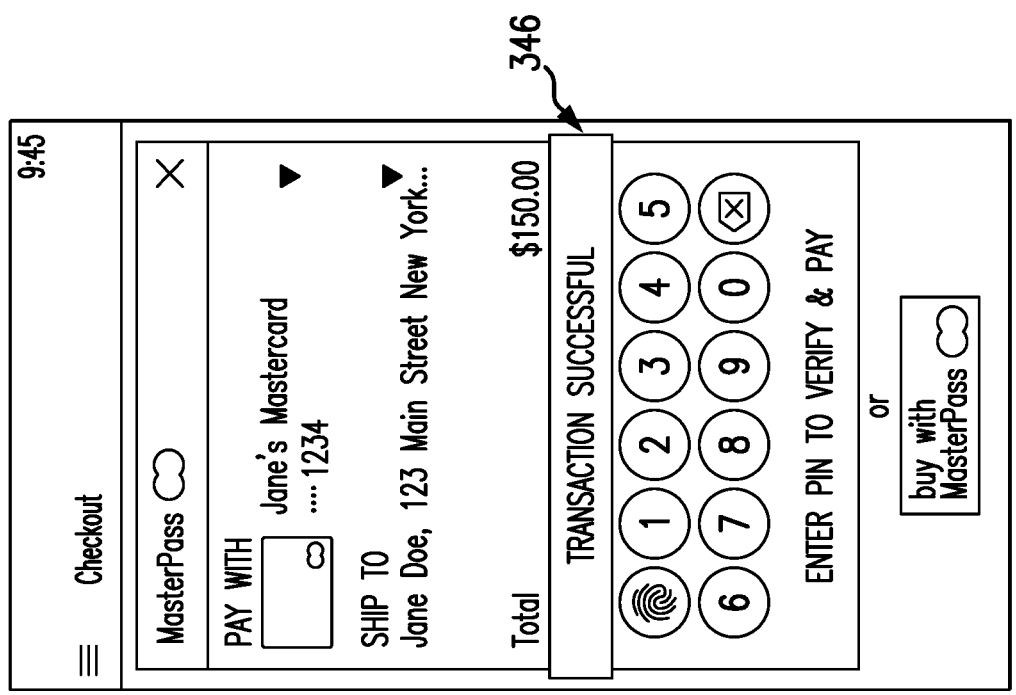

At this point in the process, in some implementations the single-screen checkout application 112 (See FIG. 1) causes transmission of the selected payment card account information, the total transaction amount and the PIN via the Internet 114 to the wallet server computer 150 for cardholder authentication and purchase transaction authorization processing. In some other embodiments, the single-screen checkout application 112 causes the mobile device processor to authenticate the user or cardholder using locally stored data, and then transmits an indication that the user has been validated along with mobile payment device information and purchase transaction data to the wallet server 150 for association with the checkout transaction at the central switch 130. When the cardholder's mobile device receives an authorization message from, for example, the wallet server computer via the Internet, then in some embodiments the confirmation page 348 shown in FIG. 3H is provided on the cardholder's mobile device display screen or touch screen component. In particular, in some embodiments the confirmation page includes a "Transaction Complete" icon 350 (here, a check mark to indicate successful transaction completion), a summary 352 of the purchase transaction (which may include a description of the purchased item(s), the item and shipping costs, the total costs, and the like), a transaction order number 354 (which may also include a representation of the payment card used for the purchase), and a "continue shopping" radio button 356. The confirmation page 348 shown in FIG. 3H assures the cardholder that the purchase transaction was successfully completed.

Figure 3I:
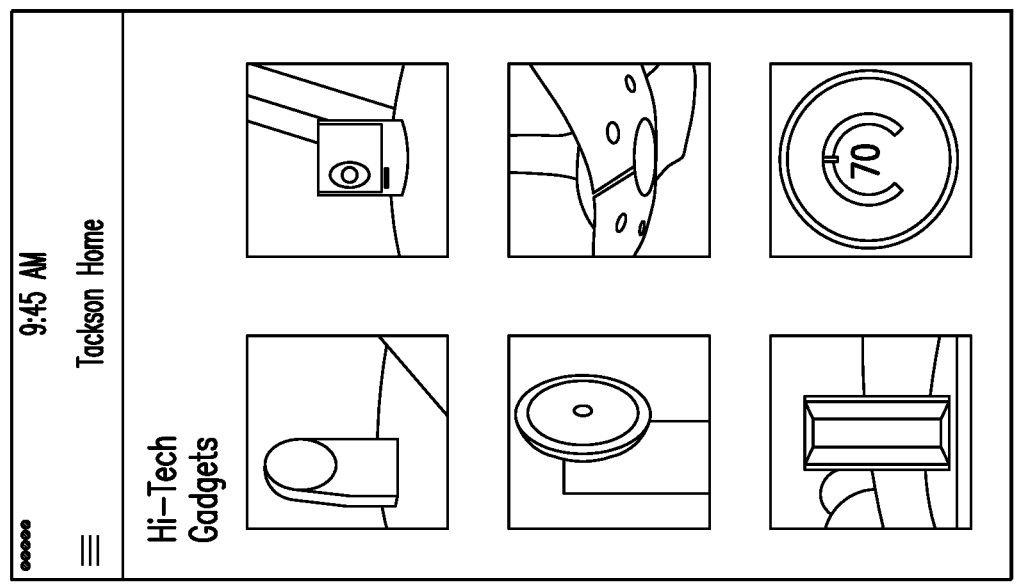

In some embodiments, when the cardholder selects the radio button 356 shown in FIG. 3H, then the merchant's payment application 106 may function to display the merchant's home page 360 as shown in FIG. 3I on the cardholder's mobile device display screen or touch screen component. However, in some implementations when the radio button 356 is chosen a different merchant webpage may be displayed.

Figures 4C, 4D:
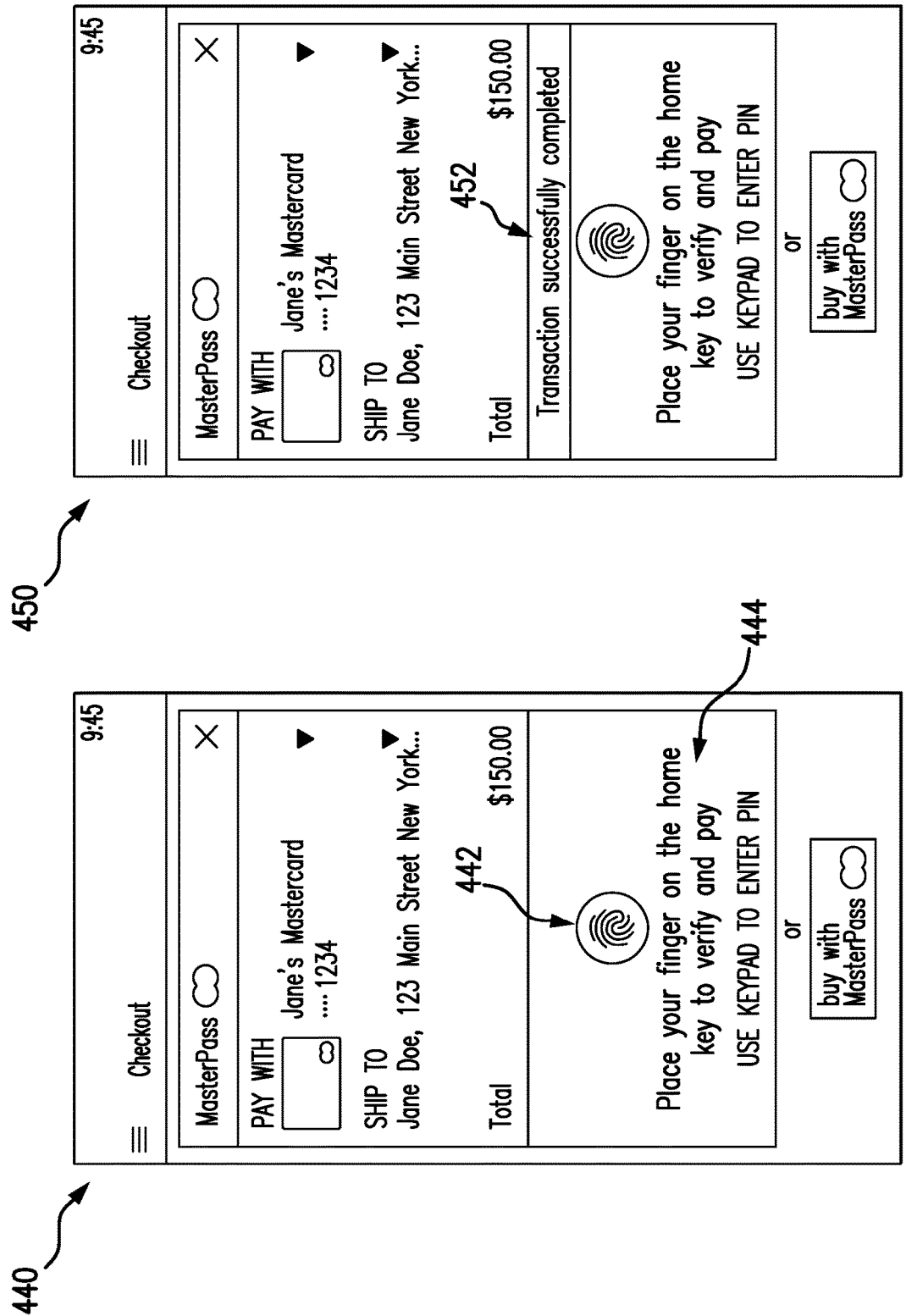
Figure 4E:
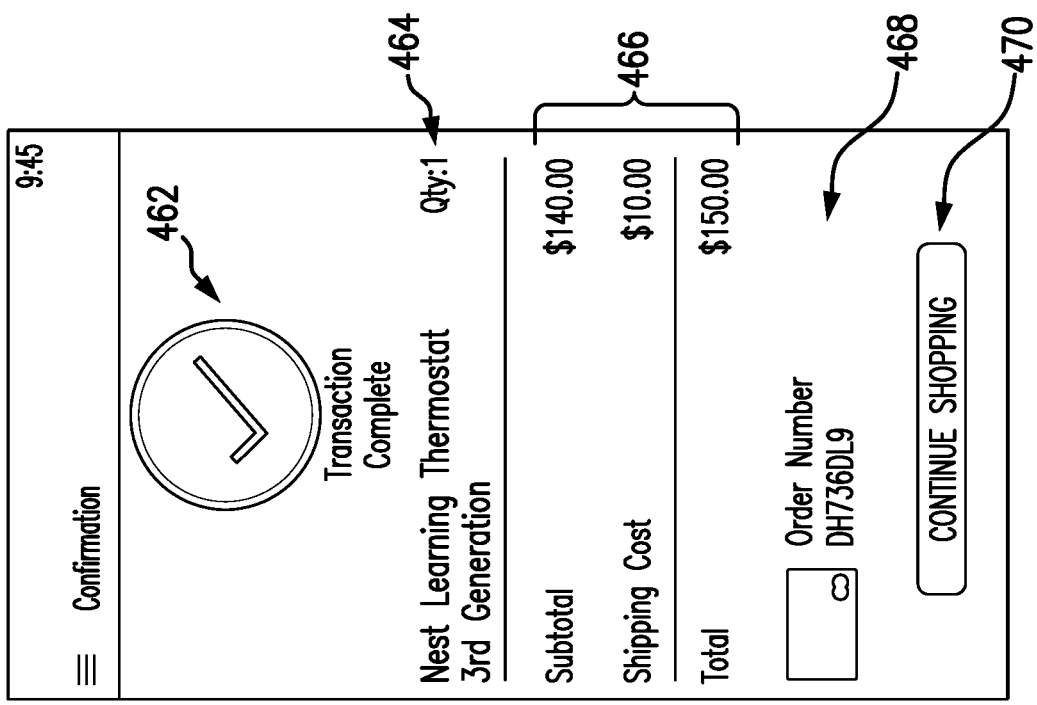

FIGS. 4A-4E are examples of display component displays (or screen shots) of a mobile device single-screen checkout user interface in accordance with some other embodiments. These screen shots are examples of alternate displays or screens (as compared to FIGS. 3A-3I) presented to a user (such as a cardholder) utilizing the single-screen checkout user interface on the cardholder's mobile device to conduct and/or consummate purchase transactions. FIG. 4A is an example of a merchant checkout page 400 displayed on a user's mobile device display screen component (which is a touch screen in this example) illustrating a merchant application checkout interface (utilizing, for example, the merchant application 106 of FIG. 1). The merchant application checkout interface screen shot shows that the "Nest Learning Thermostat" item 402 has been selected by the user for purchase, shows the item name and quantity 404, a shipping address 406, a subtotal 408 (of $140.00), a shipping cost 410 (of $10.00), and a total cost 412 (of $150.00). On the bottom of the merchant checkout screen are three options for selection by the user: a "Checkout Now" radio button 414 and a "Buy with MasterPass™" radio button 416. If the user selects the "Checkout Now" button, then the cardholder or customer may be directed to a merchant website payment page (not shown) that may be pre-filled with payment card account information that was provided by the user, for example, during an enrollment or registration process, and checkout proceeds with that data. In some embodiments, the user may also be provided with a "Change Wallet" link or option (not shown) for selection when the cardholder's mobile device 102 has several wallet applications installed on his or her mobile device.

Referring again to FIG. 4A, when the user selects the "Buy with MasterPass™" radio button 416, then the single-screen checkout application 112 is initiated and the display screen 420 of FIG. 4B is presented to the user that partially overlays the merchant's checkout webpage, as shown. In particular, the "Checkout" title at the top is still visible (although it may be shaded to be a slightly different color than that shown in FIG. 4A) and the radio button 416 is still visible at the bottom (although it, too, may be shaded to be a slightly different, such as a darker color than that shown in FIG. 4A). The single-screen checkout user interface 420 includes a "MasterPass" indication 422 (which can be de-selected by the user by touching the "X" icon to return to the "Checkout" display screen of FIG. 4A), a payment card account drop down menu 424, a "Ship To" drop down menu 426, a "Total" amount 428, a small or mini-keyboard 430, and a message field 432 which states "Enter PIN or select FINGERPRINT to Verify & Pay." As shown, the mini-keyboard 430 includes a fingerprint icon 434, numeric keys labeled from zero to nine (0-9), and a "backspace" key 436. As explained above, the user or cardholder may use the drop down menus to make selections such as which payment card account to use, and/or which shipping address to utilize for the transaction. In addition, it should be understood that the mini-keyboard 430 may be presented in any number of ways on the display screen or touch screen component of the user's mobile device, for example, the fingerprint key 434 may be located in a different position, such as above the backspace key 432.

Referring again to FIG. 4B, in some embodiments when the user or cardholder selects the fingerprint icon 434 by touching it with a finger on the touch screen component, the display screen 440 shown in FIG. 4C is presented. In particular, an enlarged fingerprint icon 442 is shown with instructions 444 that state: "Place your finger on the home key to verify and pay." After the cardholder touches his or her index finger (or whichever finger was used during enrollment) on the enlarged fingerprint icon 442, a "processing" indication may be presented (not shown) to notify the cardholder that the fingerprint data is being evaluated. In some implementations, the single-screen checkout application 112 causes transmission of the selected payment card account information, the total transaction amount and the fingerprint data via the Internet 114 to the wallet server computer 150 for cardholder authentication and purchase transaction authorization processing. In some other embodiments, the single-screen checkout application 112 causes the mobile device processor to authenticate the user or cardholder using locally stored fingerprint data, and then transmits an indication that the user has been authenticated or verified along with mobile payment device information and purchase transaction data to the wallet server 150 for association with the checkout transaction at the central switch 130.

When the cardholder's mobile device receives an authorization message from, for example, the wallet server computer via the Internet, then the display page 450 of FIG. 4D may be generated which includes a "Transaction successfully completed" message 452. The confirmation page 460 shown in FIG. 4E may then be displayed next on the cardholder's mobile device display component. In some embodiments the confirmation page 460 includes a "Transaction Complete" icon 462, a description of the purchased item 464 with quantity, a purchase transaction summary section 466 (which may include a subtotal, shipping cost and total cost), a transaction order number 468 (which may also include a representation of the payment card used for the purchase), and a "continue shopping" radio button 470. The confirmation page 460 shown in FIG. 4E assures the cardholder that he or she is still at the merchant's website and that the purchase transaction was successfully completed. When the cardholder selects the radio button 470, the merchant's payment application 106 may function to next display, for example, the merchant's home page (not shown) on the display component of the cardholder's mobile device, or a different web page of the merchant may be displayed.

Figure 5:
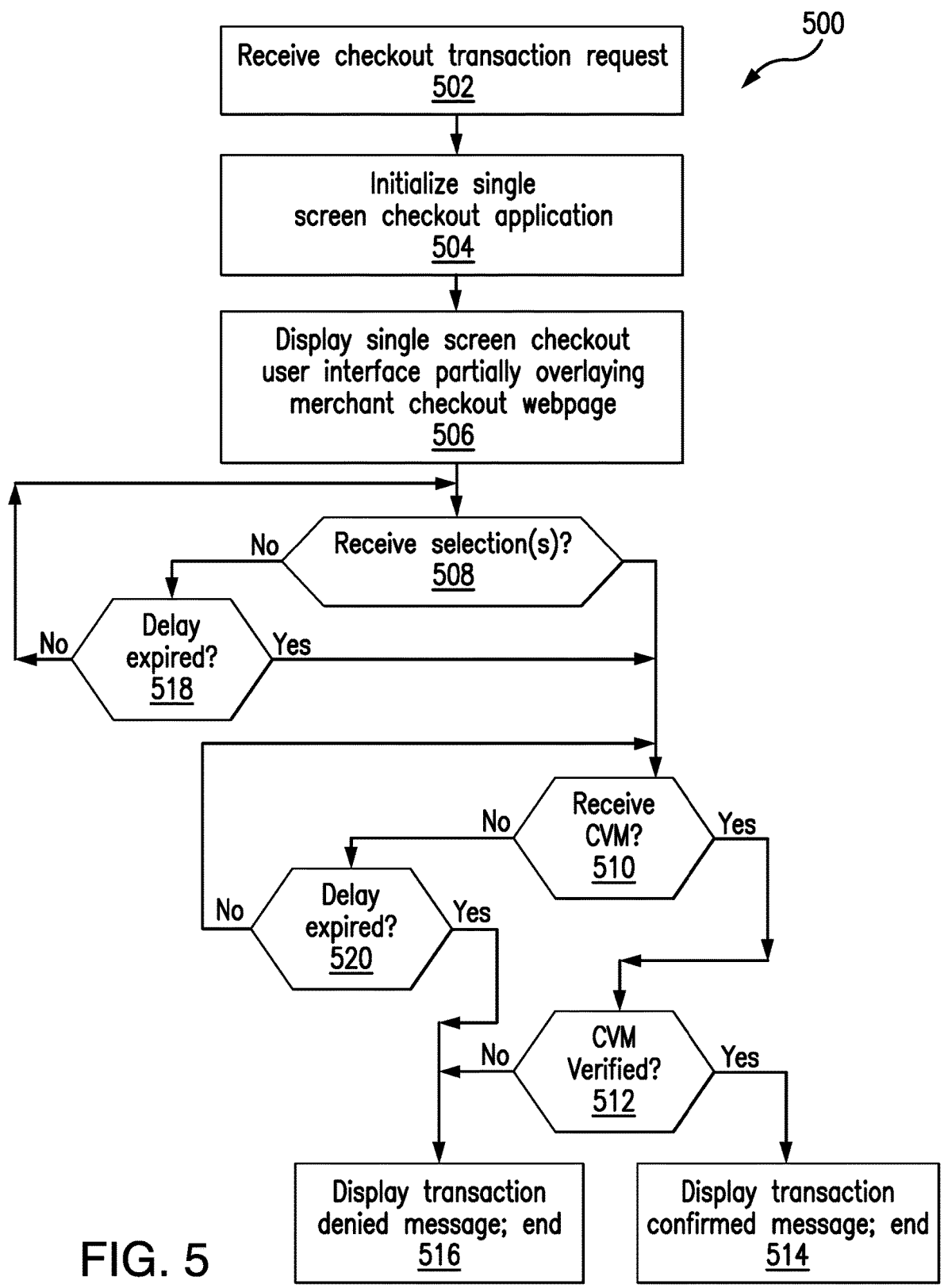
FIG. 5 is a flowchart illustrating a mobile device single-screen checkout process in accordance with some embodiments.

FIG. 5 is a flowchart illustrating a mobile device single-screen checkout process 500 in accordance with some embodiments. A mobile device processor receives 502 a single screen checkout transaction request via a mobile wallet application and then initializes 504 a single screen checkout application. For example, a "Buy with MasterPass™" radio button can be selected by a user to initiate the single-screen checkout application. Next, the mobile device processor displays 506 a single-screen checkout user interface which partially overlays the merchant's checkout webpage on the display component of the user's mobile device. The single screen checkout user interface may include one or more purchase transaction options that can include pre-selected items for application to the purchase transaction which can be changed by the user. For example, the single screen checkout user interface may include a payment card account number that can be changed via a drop down menu, and/or a shipping address for the item(s) being purchased which also could be changed via a drop down menu, and/or a shipping method that also could be changed via a drop down menu (or via some other data entry method). The single screen checkout user interface may also include data such as a total amount due (which may change automatically as options, such as the shipping method, are changed or updated), a mini-keyboard display on the touch screen for accepting user input. A customer verification method (CVM) message may also appear notifying the user that a particular type of CVM (such as "Enter mobile PIN to Verify & Pay") is required to consummate the transaction. The mobile device processor next receives 508 selection(s) of a payment card account and/or a shipping address and/or a shipping method (and the like), and then receives 510 the requested CVM. If the CVM is verified then the mobile device processor displays 514 a confirmation message on the display component of the user's mobile device. However, if the CVM is not verified in step 512, then the mobile device processor displays 516 a transaction denied message on the display component of the user's mobile device, and the process ends.

Referring again to FIG. 5, if in step 508 the mobile device processor does not receive any selection(s), and a predetermined delay time 518 has not expired, then the mobile device processor continues checking for entry of any selections; but if the predetermined delay time 518 expires, then the mobile device processor checks for entry of the CVM 510. If CVM is not entered yet and another predetermined delay time 520 has not yet expired, then the mobile device processor continues checking for entry of the CVM 510; however, if the predetermined delay time 520 expires, then the mobile device processor displays 516 a transaction denied message on the display component of the user's mobile device, and the process ends. It should be understood that the predetermined delay times utilized in steps 518 and 520 can be anywhere from about ten (10) seconds to about sixty (60) seconds, or some other delay time based on what could or should be considered a reasonable amount of time for a user or consumer to make one or more selections and/or to enter requested data, for example, on a touch screen component of his or her mobile device.

Thus, pursuant to the disclosed embodiments, the single-screen checkout application generates a single-screen checkout user interface that partially overlays the merchant's checkout page on a display screen or touch screen component of the user's mobile device, and eliminates presentation of an excessive amount of screens and/or input choices for the user. The single-screen checkout user interface utilizes a minimal amount of screen space, yet provides the user with all of the choices needed to conduct and/or consummate a purchase transaction. In addition, the single-screen checkout user interface minimizes and/or eliminates consumer or user confusion by partially overlaying the merchant's checkout webpage so that the user understands that navigation to another website page has not taken place. Thus, the consumer or user is confident that a transaction is taking place with the merchant and not some other third party. Such functionality also benefits merchants because when users or cardholders or consumers are comfortable with the checkout process then they are less likely to abandon the purchase transaction during the checkout phase of the purchase transaction.

As used herein, components and/or devices, including those associated with the mobile device payment processing system(s) and any other device described herein, may exchange information via a communication network, which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

As used herein, the terms card, transaction card, financial transaction card, payment card, and the like, refer to any suitable transaction card or payment card account, such as a credit card, a debit card, a prepaid card, a charge card, a membership card, a promotional card, a frequent flyer card, an identification card, a gift card, a deposit account, and the like. As another example, the terms may refer to any other device or media that may hold payment account information, such as mobile phones, Smartphones, tablet computers, personal digital assistants (PDAs), key fobs, laptop computers, and the like. Pursuant to some embodiments, "tokenized" account information may be used. For example, payment card data may be "tokenized" pursuant to the MasterCard Digital Enablement Service ("MDES") or the like.

Also, the term "payment card system" refers to a system that may include a central switch for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations. A number of trademark and/or brand names may be used in the drawings and the specification to refer to example products, and it is the applicant's intent to provide proper attribution to those trademark owners.

As will be appreciated based on the foregoing specification, the above-described examples of the disclosure may be implemented using computer programming or engineering techniques including computer software, firmware, hardware, middleware or any combination or subset thereof. Any such resulting program, having computer-readable code, may be embodied or provided within one or more non-transitory computer-readable media, thereby making a computer program product, i.e., an article of manufacture, according to the examples discussed herein. For example, suitable non-transitory computer-readable media may include, but is not limited to, a fixed drive, diskette, optical disk, magnetic tape, bubble memory, flash memory, semiconductor memory such as read-only memory (ROM), Nano memory cell(s), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in an assembly language and/or machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. In addition, one or more of the steps may not be required for performance in some embodiments.

The present invention has been described herein in connection with specific exemplary embodiments, but it should be understood that various changes, modifications, substitutions, and/or alterations which may be apparent to those skilled in the art can be made without departing from the spirit and scope of the invention as set forth in the appended claims.

What is claimed is:

1. A method of operating a mobile device to consummate an online purchase transaction comprising:
   receiving, by a mobile device processer of a consumer mobile device from a user involved in a purchase transaction, a mobile device single screen checkout request;
   initializing, by the mobile device processor, a single screen checkout application;
   displaying to the user, by the mobile device processor on a touch screen component of the consumer mobile device, a single screen checkout user interface that partially overlays a merchant checkout webpage such that an identifiable portion of the merchant checkout webpage is still visible, wherein the single screen checkout user interface comprises purchase transaction options and a purchase amount of the purchase transaction;
   receiving, by the mobile device processor on the touch screen component from the user, selection of a purchase transaction option comprising at least one of a payment card account and a shipping address;
   displaying, by the mobile device processor on the touch screen component in response to the selection, an updated single screen checkout user interface partially overlaying the identifiable portion of the merchant checkout webpage, the updated single screen checkout user interface depicting at least one of a selected payment card account and a selected shipping address, the transaction amount, and a cardholder verification method (CVM) request message;
   receiving, by the mobile device processor via the touch screen component, user input responsive to the CVM request message;
   transmitting, by the mobile device processor, the user input, the selected payment card account, and the transaction amount to a wallet server computer; and
   displaying to the user, by the mobile device processor on the touch screen component, a transaction successful message on the updated single screen checkout user interface such that the identifiable portion of the merchant checkout webpage is still visible when the user input satisfies the CVM request message.

2. The method of claim 1, further comprising:
   receiving, by the mobile device processor from the wallet server computer, a transaction confirmation message indicating that the purchase transaction has been approved; and
   displaying to the user, by the mobile device processor on the touch screen component, a confirmation page indicating successful completion of the purchase transaction.

3. The method of claim 1, further comprising, subsequent to receiving the user input responsive to the CVM request:
   determining, by the mobile device processor, that the user input satisfies the CVM request message;
   transmitting, by the mobile device processor to a wallet server computer, the purchase transaction data and a message indicating satisfaction of the CVM request by the user;
   receiving, by the mobile device processor from the wallet server computer, a transaction confirmation message indicating that the purchase transaction has been approve; and
   displaying to the user, by the mobile device processor on the touch screen component, a confirmation page indicating successful completion of the purchase transaction.

4. The method of claim 3, further comprising, subsequent to transmitting the purchase transaction data and the message indicating satisfaction of the CVM request:
   receiving, by the mobile device processor from the wallet server computer, a transaction denied message indicating that the purchase transaction has been declined; and
   displaying, by the mobile device processor on the touch screen component, a transaction denied message.

5. The method of claim 1, wherein the mobile device single screen checkout request is received via a merchant application.

6. A mobile device comprising:
   a mobile device processor;
   a touch screen display component operably connected to the mobile device processor;
   receive/transmit circuitry operably connected to the mobile device processor; and
   a storage device operably connected to the mobile device processor, wherein the storage device comprises instructions configured to cause the mobile device processor to:
   receive a mobile device single screen checkout request from a user involved in a purchase transaction;
   initialize a single screen checkout application;
   display a single screen checkout user interface to the user on the touch screen display component that partially overlays a merchant checkout webpage such that an identifiable portion of the merchant checkout webpage is still visible, wherein the single screen checkout user interface comprising purchase transaction options and a purchase amount of the purchase transaction;
   receive selection of a purchase transaction option comprising at least one of a payment card account and a shipping address;
   display on the touch screen display component in response to the selection, an updated single screen checkout user interface partially overlaying the identifiable portion of the merchant checkout webpage, the updated single screen checkout user interface depicting at least one of a selected payment card account and a selected shipping address, the transaction amount, and a cardholder verification method (CVM) request message;

receive user input via the touch screen display component responsive to the CVM request message;

transmit the user input, the selected payment card account, and the transaction amount to a wallet server computer; and display to the user on the touch screen display component a transaction successful message on the updated single screen checkout user interface such that the identifiable portion of the merchant checkout webpage is still visible when the user input satisfies the CVM request message.

7. The mobile device of claim 6, wherein the storage device stores further instructions configured to cause the mobile device processor to:

receive a transaction confirmation message from the wallet server computer indicating that the purchase transaction has been approved; and display to the user a confirmation page indicating successful completion of the purchase transaction on the touch screen component.

8. The mobile device of claim 6, wherein the storage device stores further instructions, subsequent to the instructions for receiving the user input responsive to the CVM request configured to cause the mobile device processor to:

determine, that the user input satisfies the CVM request message;

transmit the purchase transaction data and a message indicating satisfaction of the CVM request by the user to a wallet server computer;

receive a transaction confirmation message from the wallet server computer indicating that the purchase transaction has been approved;

display to the user a confirmation page indicating successful completion of the purchase transaction on the touch screen component.

9. The mobile device of claim 8, wherein the storage device stores further instructions, subsequent to the instructions for transmitting the purchase transaction data and the message indicating satisfaction of the CVM request, configured to cause the mobile device processor to:

receive a transaction denied message from the wallet server computer indicating that the purchase transaction has been declined; and display a transaction denied message on the touch screen component.

10. The mobile device of claim 6, wherein the instructions for receiving the mobile device single screen checkout request comprise instructions configured to cause the mobile device processor to receive the mobile device single screen checkout request from a merchant application.

11. A mobile device purchase transaction system comprising:

a wallet server computer;

a central switch computer operably connected to the wallet server computer; and a user mobile device operably connected to the wallet server computer, wherein the user mobile device comprises a mobile device processor operably connected to a storage component, a touch screen display component and receive/transmit circuitry, and wherein the storage device comprises instructions configured to cause the mobile device processor to:

receive a mobile device single screen checkout request from a user involved in a purchase transaction;

initialize a single screen checkout application;

display a single screen checkout user interface to the user on the touch screen display component that partially overlays a merchant checkout webpage such that an identifiable portion of the merchant checkout webpage is still visible, wherein the single screen checkout user interface comprising purchase transaction options and a purchase amount of the purchase transaction;

receive selection of a purchase transaction option comprising at least one of a payment card account and a shipping address;

display on the touch screen display component in response to the selection, an updated single screen checkout user interface partially overlaying the identifiable portion of the merchant checkout webpage, the updated single screen checkout user interface depicting at least one of a selected payment card account and a selected shipping address, the transaction amount, and a cardholder verification method (CVM) request message;

receive user input via the touch screen display component responsive to the CVM request message;

transmit the user input, the selected payment card account, and the transaction amount to a wallet server computer; and display to the user on the touch screen display component a transaction successful message on the updated single screen checkout user interface such that the identifiable portion of the merchant checkout webpage is still visible when the user input satisfies the CVM request message.

12. The system of claim 11, wherein the storage component of the mobile device stores further instructions configured to cause the mobile device processor to:

receive a transaction confirmation message from the wallet server computer indicating that the purchase transaction has been approved; and display to the user a confirmation page indicating successful completion of the purchase transaction on the touch screen component.

13. The system of claim 11, wherein the storage component of the mobile device stores further instructions, subsequent to the instructions for receiving the user input responsive to the CVM request configured to cause the mobile device processor to:

determine, that the user input satisfies the CVM request message;

transmit the purchase transaction data and a message indicating satisfaction of the CVM request by the user to a wallet server computer;

receive a transaction confirmation message from the wallet server computer indicating that the purchase transaction has been approved;

display to the user a confirmation page indicating successful completion of the purchase transaction on the touch screen component.

14. The system of claim 13, wherein the storage component of the mobile device stores further instructions, subsequent to the instructions for transmitting the purchase transaction data and the message indicating satisfaction of the CVM request, configured to cause the mobile device processor to:

receive a transaction denied message from the wallet server computer indicating that the purchase transaction has been declined; and display a transaction denied message on the touch screen component.

\* \* \* \* \*